United States Patent [19]
Fujikata et al.

[11] Patent Number: 6,051,309
[45] Date of Patent: Apr. 18, 2000

[54] MAGNETORESISTANCE EFFECT FILM AND METHOD FOR MAKING THE SAME

[75] Inventors: Jun-ichi Fujikata; Masafumi Nakada, both of Tokyo, Japan

[73] Assignee: NEC Corporation, Japan

[21] Appl. No.: 08/997,645

[22] Filed: Dec. 23, 1997

[30] Foreign Application Priority Data

Dec. 26, 1996 [JP] Japan .................................. 8-347219

[51] Int. Cl.[7] ...................................................... G11B 5/66
[52] U.S. Cl. ......................... 428/332; 428/336; 428/692; 428/694 R; 428/694 T; 428/694 TS; 428/694 TM; 428/900; 360/113; 324/252
[58] Field of Search ............................... 428/692, 694 R, 428/694 T, 694 TS, 694 TM, 900, 332, 336; 360/113; 324/252

[56] References Cited

U.S. PATENT DOCUMENTS 5,549,978  8/1996  Iwasaki ................................. 428/692

FOREIGN PATENT DOCUMENTS 261572   3/1990  Japan .
4358310  12/1992  Japan .
794326   4/1995  Japan .
8127864  5/1996  Japan .
8180327  7/1996  Japan .
950611   2/1997  Japan .
9251621  9/1997  Japan .

OTHER PUBLICATIONS

"Thin Film Magnetoresistors in Memory, Storage, and Related Applications" Thompson et al IEEE Transactions on Magnetics, vol. MAG–11, No. 4; Jul. 1975; pp. 1039–1050.

Primary Examiner—Leszek Kiliman
Attorney, Agent, or Firm—Hayes, Soloway, Hennessey, Grossman & Hage, P.C.

[57] ABSTRACT

Disclosed are magnetoresistance effect films which have a magnetic thin film and an anti-ferromagnetically coupled magnetic multilayer thin film inserted into the interface between the non-magnetic thin film and the magnetic thin film, and a method for forming magnetoresistance effect films including the step of thermally treating the anti-ferromagnetic thin film and the magnetic multilayer thin film at a temperature of 200 to 300° C. so as to generate one-directional anisotropy in the magnetic multilayer thin film, or the step of rotating by 90° a magnetic field applied during the film formation so that the weak magnetization axes of the magnetic thin film and the magnetic multilayer thin film are orthogonal to each other.

23 Claims, 13 Drawing Sheets

FIG.9

| ANTI-FERROMAGNETIC THIN FILM | EXCHANGE COUPLING MAGNETIC FIELD |
|---|---|
| FeMn | 250 [Oe] |
| NiMn | 610 [Oe] |
| PtMn | 450 [Oe] |
| PdMn | 470 [Oe] |
| PdPtMn | 500 [Oe] |
| CoMn | 230 [Oe] |
| CrMn | 330 [Oe] |
| CuMn | 120 [Oe] |

FIG. 10

| ANTI-FERROMAGNETIC THIN FILM | EXCHANGE COUPLING MAGNETIC FIELD |
|---|---|
| NiO | 208 [Oe] |
| NiO/Fe-O | 450 [Oe] |
| NiCoO/Fe-O | 420 [Oe] |
| Fe-O | 300 [Oe] |
| NiO/Co-O | 201 [Oe] |
| Fe-O/Co-O | 220 [Oe] |

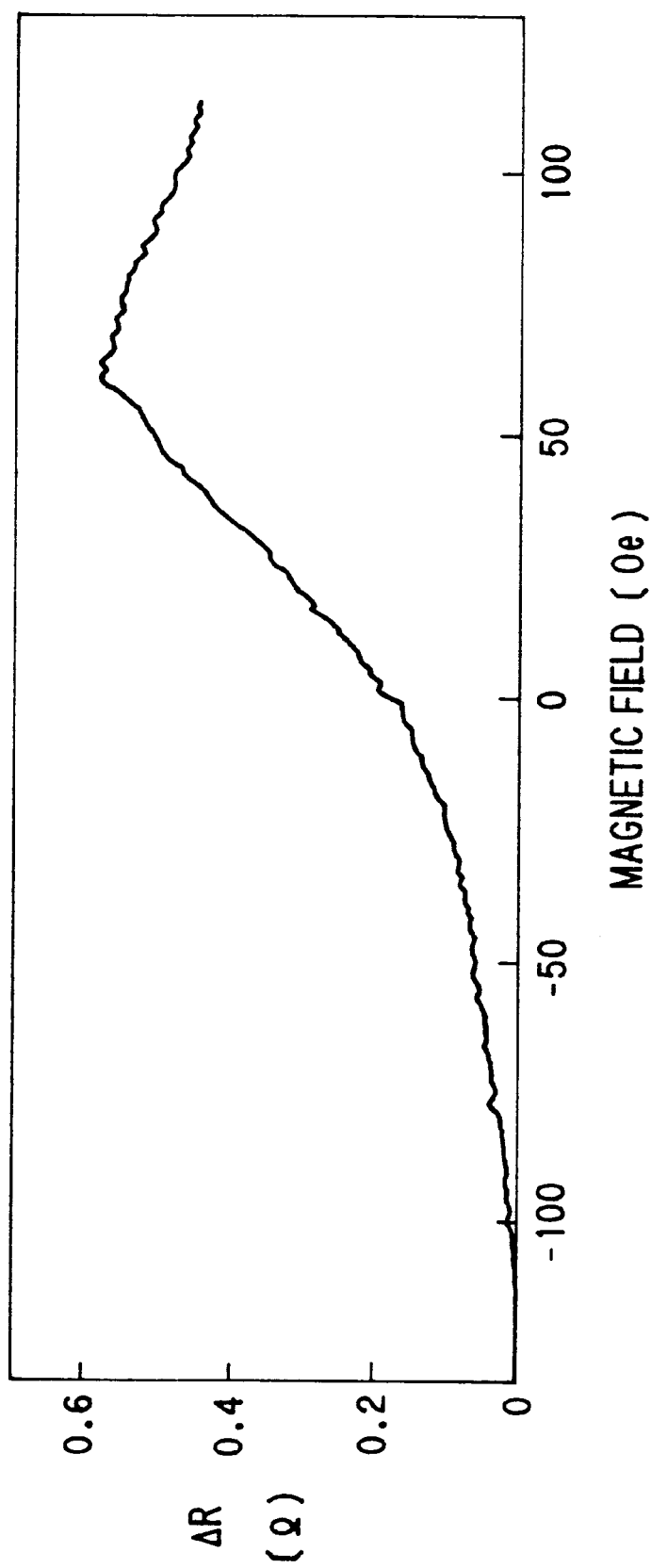

MAGNETORESISTANCE EFFECT FILM AND METHOD FOR MAKING THE SAME

FIELD OF THE INVENTION

This invention relates to magnetoresistance effect film used in a magnetoresistance effect device used for reading a signal with a magnetic field intensity from a magnetic recording medium, and a method for making the same.

BACKGROUND OF THE INVENTION

A magnetic reading converter called a magnetoresistive (MR) sensor or head is conventionally known, where it is know that data with a high linear density can be read out from a magnetic surface. In such a MR sensor, a magnetic signal is detected through a resistance change which is a function of intensity and direction of magnetic flux sensed by a reading element.

The MR sensor is actuated according to anisotropic magnetoresistance (AMR) effect where one component of a resistance in the reading element is varied proportionally to the square of the cosine of an angle formed between the magnetization direction and the direction of sensing current flowing through the element. The AMR affect is detailed in D. A. Thompson et al., "Thin Film Magnetoresistors in Memory, Storage, and Related Applications", IEEE Trans. on Mag., Vol. MAG-11, No.4, pp.1039 to 1050(1975).

Furthermore, a significant magnetoresistance effect is recently reported, where a resistance change of a layered magnetic sensor is attributed to the spin-dependent transmission of conduction electrons between magnetic layers disposed through a non-magnetic layer and the spin-dependent scattering at the interface occurring therewith. This magnetoresistance effect is called 'giant magnetoresistance effect', 'spin valve effect', or the like. Such a magnetoresistive sensor is of a suitable material and has an improved density and a large resistance change as compared with a sensor using the AMR effect. In this kind of MR sensor, in-plane resistance between a pair of ferromagnetic layers isolated by a non-magnetic layer is varied proportionally to the cosine of an angle between the magnetization directions of the two layers.

Japanese patent application laid-open No.2-61572(1990) discloses a layered magnetic structure where a large MR change is given by anti-parallel arrangement of magnetization between magnetic layers. A material available for the layered structure disclosed therein is a transition metal and an alloy for the ferromagnetic layer.

Also, it discloses that a structure where an anti-ferromagneticlayer is added to at least one of two ferromagnetic layers to be separated by an intermediate layer is suitable and the anti-ferromagnetic layer in suitably of FeMn.

Japanese patent application laid-open No.4-358310(1992) disclosed a MR sensor that has two ferromagnetic thin film layers separated by a non-magnetic metal thin film layer, the magnetization directions of the two ferromagnetic thin film layer are orthogonal to each other when applied magnetic field is zero, and a resistance between two non-coupled ferromagnetic layers is varied proportionally to the cosine of an angle formed between the magnetization directions of the two layers and is independent of the direction of current flowing through the sensor.

Japanese patent application laid-open No.8-127864(1996) discloses a magnetoresistance effect device that is composed of several magnetic thin films layered through a non-magnetic layer on a substrate, an anti-ferromagnetic thin film is provided next to one of magnetically soft thin films which are adjacent through a non-magnetic thin film, $H_{c2} < H_r$ is given where $H_r$ is a bias magnetic field of the anti-ferromagnetic thin film and $H_{c2}$ is coercive force of the magnetically soft thin film, and the anti-ferromagnetic layer is of a superlattice composed of at least two of NiO, $Ni_xCo_{1-x}O$, CoO. Also, Japanese patent application laid-open No.9-50611(1997) discloses a magnetoresistance effect device composed of magnetoresistance effect film with the same structure where the anti-ferromagnetic layer is composed of two layer film in which CoO is layered by 10 to 40 Å on NiO.

However, there are several problems with conventional magnetoresistance effect film.

First, a magnetization step of conducting thermal treatment in a magnetic field is needed for the fabrication process of the magnetoresistance effect device since one-directional anisotropy is applied to adjacent magnetic thin films using an anti-ferromagnetic thin film.

Second, the thermal stability of one-directional anisotropy at the working temperature is not good since the one-directional anisotropy is applied to the adjacent magnetic thin films using an anti-ferromagnetic thin film with a relatively low Neel temperature.

Third, device sensitivity or the symmetricalness in device output is deteriorated since the ferromagnetic layers may be magnetostatically coupled when the device is patterned, due to the multilayer structure where the ferromagnetic layers are adjacent through a non-magnetic layer.

Fourth, the ratio of resistance change is lower than that of magnetoresistance effect film called 'coupling type' with a multilayer structure since resistance change is basically applied using a variation in mean free path length of conduction electrons in the three layers of magnetic thin film/non-magnetic thin film/magnetic thin film.

SUMMARY OF THE INVENTION

Accordingly, it is an object of the invention to provide a magnetoresistance effect film which presents a large linear resistance change around the zero magnetic field and has excellent thermal stability and good magnetic field sensitivity.

It is a further object of the invention to provide a method for making such magnetoresistance effect film.

According to the invention, a magnetoresistance effect film, comprises:

a magnetic thin film; and magnetic multilayer thin film which in disposed through a non-magnetic thin film next to the magnetic thin film, wherein the magnetic multilayer thin film is anti-ferromagnetically coupled.

According to another aspect of the invention, a method for making a magnetoresistance effect film which comprises a magnetic thin film, a magnetic multilayer thin film is inserted into the interface between the non-magnetic thin film and the magnetic thin film wherein the magnetic multilayer thin film is anti-ferromagnetically coupled, and an anti-ferromagnetic thin film which is formed on the magnetic multilayer thin film or on which the magnetic multilayer thin film is formed, comprising the step of:

thermally treating the anti-ferromagnetic thin film and the magnetic multilayer thin film at a temperature of 200 to 300° C. so as to generate one-directional anisotropy in the magnetic multilayer thin film.

According to another aspect of the invention, a method for making a magnetoresistance effect film which comprises magnetic thin film, and magnetic multilayer thin film which is disposed through a non-magnetic thin film next to the magnetic thin film wherein the magnetic multilayer thin film is anti-ferromagnetically coupled, comprising the step of:

rotating by 90° a magnetic field applied during the film formation so that easy magnetization axes of the magnetic thin film and the magnetic multilayer thin film are orthogonal to each other.

In this invention, the relation of $H_{S1}<H_{S2}$ is obtained, where the saturation magnetic fields of the magnetic thin film and magnetic multilayer film are $H_{S1}$ and $H_{S2}$, respectively. Therefore, when a magnetic field(H) to satisfy the relation of $H_{S1}<H<H_{S2}$ is applied, the resistance value becomes maximum due to the difference between the magnetization directions of the magnetic thin film and magnetic multilayer film. Also, when a magnetic field(H) to satisfy the relation of $H<H_{S1}$ or $H_{S2}<H$ is applied, the resistance value becomes minimum due to the parallel magnetization directions of the magnetic thin film and magnetic multilayer film.

Thus, the magnetization change of the magnetic multilayer film to external magnetic field is smaller than that of the conventional magnetoresistance effect film. Therefore, the operation stability at the working temperature for the magnetoresistance effect device is enhanced, and the thermal treatment in magnetic field for the anti-ferromagnetic thin film is not necessary, thereby facilitating the workability.

The magnetic multilayer film has a structure composed of at least three layers where a magnetic layer and a non-magnetic layer are alternately layered. The magnetic layer in the magnetic multilayer film is mainly of Ni, Fe, Co, FeCo, NiFe, NiFeCo or an alloy of any combination of these elements. The non-magnetic layer of the magnetic multilayer film is mainly of V, Cu, Mo, Ru, Rh, Re, Ir, Cr or an alloy of any combination of these elements. Here, when the non-magnetic layer has a thickness of 4 to 15 Å, large exchange interaction occurs between the magnetic layers, therefore presenting anti-ferromagnetic interaction.

The magnetic thin film is preferably of Ni, Fe, Co, FeCo, NiFe, NiFeCo or an alloy of any combination of these elements. Thereby, the scattering effect of conduction electrons at the interface of the non-magnetic thin film/magnetic thin film appears significant thereby producing a layer resistance change.

Further, such magnetoresistance effect film is so fabricated by forming the magnetic thin film in a magnetic field that the weak magnetization axis of the magnetic thin film is perpendicular to the magnetic field direction of applied signal and the coercive force of the magnetic thin film in the magnetic field direction of applied signal satisfies the relation of $H_{C2}<H_{R2}$. In detail, this is attained by rotating the applied magnetic field by 90° during the forming of the film or rotating the substrate by 90° in magnetic field so that the weak magnetization directions of the magnetic multilayer film and magnetic thin film are orthogonal to each other.

The magnetic thin film desirably has a thickness of less than 150 Å. When the thickness is greater than 150 Å, the region not contributing to electron scattering is widened with the increase in film thickness, thereby reducing the strong magnetoresistance effect. On the other hand, the lower limit in the thickness of magnetic thin film is not specifically defined, but, in case of a thickness of less than 10 Å, the surface scattering effect of conduction electrons is increased and the magnetoresistance change is reduced. Also, in case of a thickness of greater than 10 Å, the film thickness can be easily kept to be constant, thereby obtaining excellent characteristics as well as preventing the saturation magnetization from being too small.

Further, by inserting Co, FeCo, NiCo or NiFeCo into the interface of a magnetic thin film/non-magnetic thin film, the interface scattering probability of conduction electrons can be increased, thereby obtaining a large resistance change. The lower limit of the film thickness to be inserted is 3 Å. In case of less than 3 Å, the insertion effect is reduced and the film thickness is difficult to control. Though the upper limit of the film thickness to be inserted is not specifically defined, it is desirably about 40 Å. In case of more than 40 Å, there occurs hysteresis in the output in the operation range of the magnetoresistance effect device.

Further, by disposing a permanent-magnet thin film next to a magnetic layer to detect the external magnetic field in such magnetoresistance effect film, the magnetic domain can be stabilized. Thereby, a non-linear output, such as Barkhausen jump, can be avoided. The permanent-magnet thin film is preferably of CoCr, CoCrTa, CoCrTaPt, CoCrPt, CoNiPt, CoNiCr, CoCrPtSi, FeCoCr or the like. Also, a base layer for the permanent-magnet thin film may be of Cr etc.

The non-magnetic thin film, which serves to weaken the magnetic interaction between the magnetic thin film and magnetic multilayer film, is preferably of Au, Ag, Cu, Ru or an alloy of any combination of these elements so as to obtain a large magnetoresistance change and an excellent thermal stability. According to experimental results, the thickness of the non-magnetic thin film is desirably 20 to 40 Å. In general, when the film thickness is greater than 40 Å, the resistance is determined by the non-magnetic thin film and the spin-dependent scattering effect is relatively reduced. As a result, the magnetoresistance change factor is reduced. On the other hand, when the film thickness is less than 20 Å, the magnetic interaction between the magnetic thin film and magnetic multilayer film becomes too big and a magnetic direct contact state (pinhole) occurs inevitably. Therefore, it becomes difficult to generate the difference between the magnetization directions of the magnetic thin film and magnetic multilayer film. Meanwhile, by changing the thickness of the non-magnetic thin film, a bias point in the magnetoresistance effect device fabricated can be also controlled since the magnetic interaction between the magnetic thin film and magnetic multilayer film can be thereby varied.

By adding an anti-ferromagnetic thin film to the magnetic multilayer film to be anti-ferromagnetically coupled and applying a sufficient exchange coupling magnetic field thereto, the difference between the saturation magnetic fields $H_{S1}$ and $H_{S2}$ of the magnetic thin film and magnetic multilayer film is increased. Therefore, the operation magnetic field (linear region) in the magnetoresistance effect device fabricated is increased. The anti-ferromagnetic thin film is of FeMn, IrMn, CrMn, CoMn, CuMn, PtMn, PdMn, RhMn, NiMn or an alloy of at least two of these elements. The number of layers composing the anti-ferromagnetic thin film may be one or more.

Also, the anti-ferromagnetic thin film may be composed of an oxide anti-ferromagnetic material selected from the group consisting of cobalt oxides, nickel oxides, nickel-cobalt oxides and α-phase iron oxides. In this case, by forming the film at a substrate temperature from room temperature to 300° C., the crystalline quality can be improved and the bias magnetic field can be increased. Also, in this case, by inverting 3 to 30 Å thick Fe between the anti-ferromagnetic thin film and magnetic thin film, the oxidation of the magnetic thin film can be suppressed. Therefore, the reduction in exchange coupling magnetic field or resistance change factor when thermally treated can be significantly prevented. For example, the surface roughness of the anti-ferromagnetic thin film composed of an oxide anti-ferromagnetic material can be 2 to 15 Å, thereby increasing the saturation magnetic field of the magnetic multilayer film to be anti-ferromagnetically coupled.

The film is formed by vapor deposition, sputtering, molecular beam epitaxy (MBE) etc. The substrate on which the magnetoresistance effect film is formed may be of glass, Si, MgO, $Al_2O_3$, GaAs, ferrite, $CaTi_2O_3$, $BaTi_2O_3$, $Al_2O_3$—TiC etc.

The thickness of the magnetic thin film or non-magnetic thin film can be measured by using a transmission electron microscope, scanning electron microscope, Auger electron spectroscopy analysis etc. Also, the crystalline structure of thin film can be confirmed by using X-ray diffraction method, high-energy electron diffraction method etc.

In a magnetoresistance effect device composed of magnetoresistance effect film according to the invention, the number N of repetition layers of the artificial lattice film is not specifically limited, and may be properly selected according to a target magnetoresistance change factor etc.

Further, on the surface of the top layer, an oxidation preventing film composed of Ta, Cu, Ru, Rh, Mo, Cr, silicon nitrides, silicon oxides, aluminum oxides etc. and a metal conductive layer for leading out an electrode may be provided.

Meanwhile, the magnetic characteristics of magnetic thin film existing in the magnetoresistance effect device, which cannot be directly measured, are generally measured as follows: To prepare a sample for measurement, magnetic thin film (or a magnetic layer) to be measured is formed alternately with non-magnetic thin film (or a non-magnetic layer) until the total thickness of the magnetic thin film becomes around 500 to 1000 Å. This sample is given to the measurement of the magnetic characteristics. In this case, the thickness and composition of the magnetic thin film and non-magnetic thin film (or magnetic layer and non-magnetic layer) are adjusted to be equal to those of the magnetoresistance effect device.

BRIEF DESCRIPTION OF THE DRAWINGS

The invention will be explained in more detail in conjunction with the appended drawings, wherein:

FIG. 9 is a table showing exchange coupling magnetic fields when Mn-system anti-ferromagnetic thin film is used in the magnetoresistance effect film, FIG. 10 is a table showing exchange coupling magnetic fields when oxide anti-ferromagnetic thin film is used in the magnetoresistance effect film, FIG. 13 is a graph showing MR curve of a magnetoresistance effect device film using the magnetoresistance effect film.

DESCRIPTION OF THE PREFERRED EMBODIMENTS

Magnetoresistance effect film in the preferred embodiment will be explained below.

In the magnetoresistance effect film, a magnetic multilayer film to be anti-ferromagnetically coupled is formed through a non-magnetic thin film next to a magnetic thin film, and the relation of $H_{S1}<H_{S2}$ is obtained where $H_{S1}$ is a saturation magnetic field of the magnetic thin film and $H_{S2}$ is a saturation magnetic field of the magnetic multilayer film.

Figure 3:
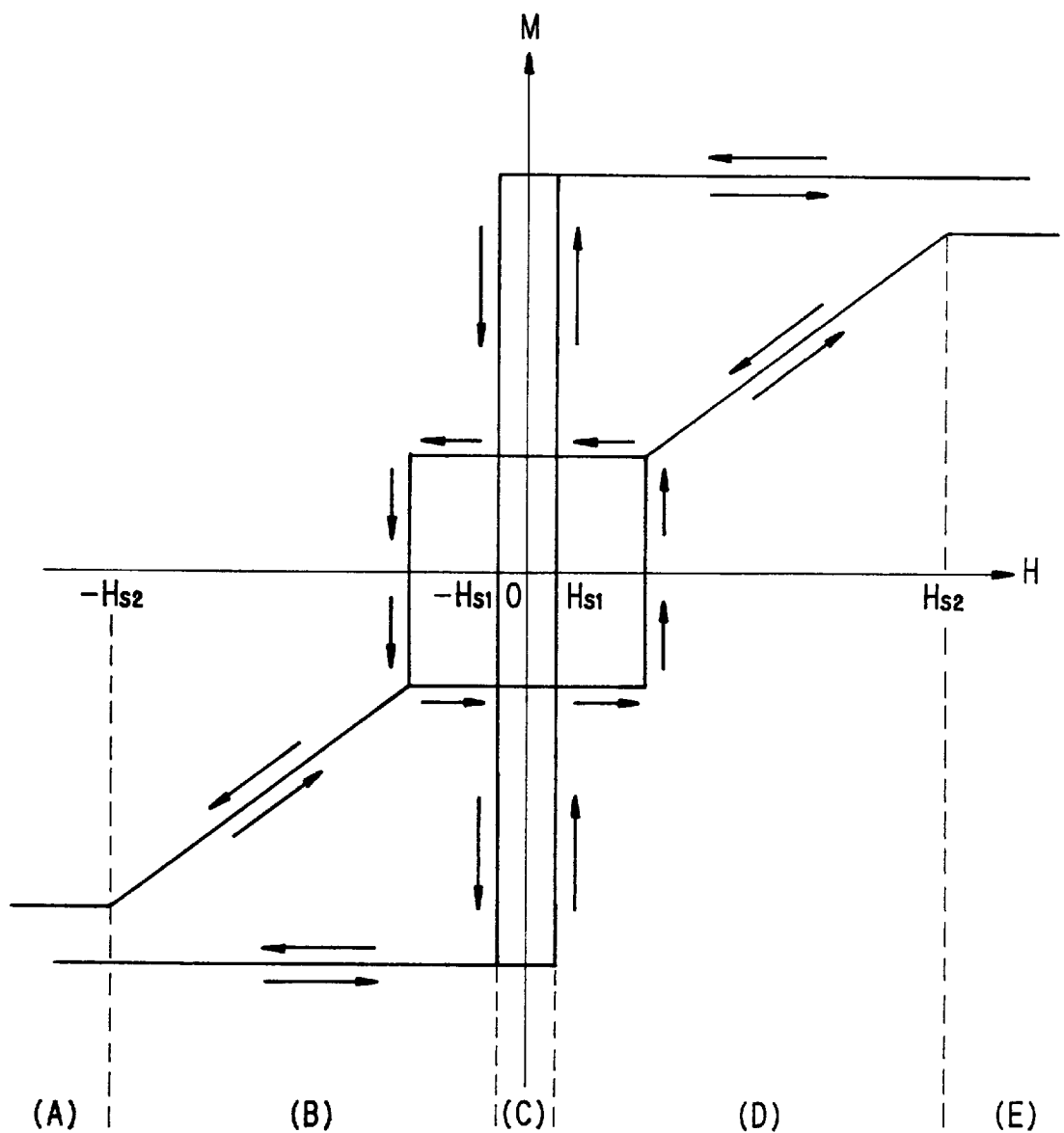
FIG. 3 is a graph showing B-H curve of the magnetoresistance effect film.

This is because the invention is based upon an observation that maximum resistance is to obtain when the magnetization directions of the magnetic thin film and anti-ferromagnetically coupled magnetic multilayer are reversed to each other. Namely, according to the invention, when an external magnetic field H, as shown in FIG. 3, lies between the saturation magnetic field $H_{S1}$ of the magnetic thin film and the saturation magnetic field $H_{S2}$ of the magnetic multilayer film, i.e., $H_{S1}<H<H_{S2}$, the magnetization directions of the magnetic thin film and magnetic multilayer are reversed to each other. Thereby, the resistance is increased.

Figure 2:
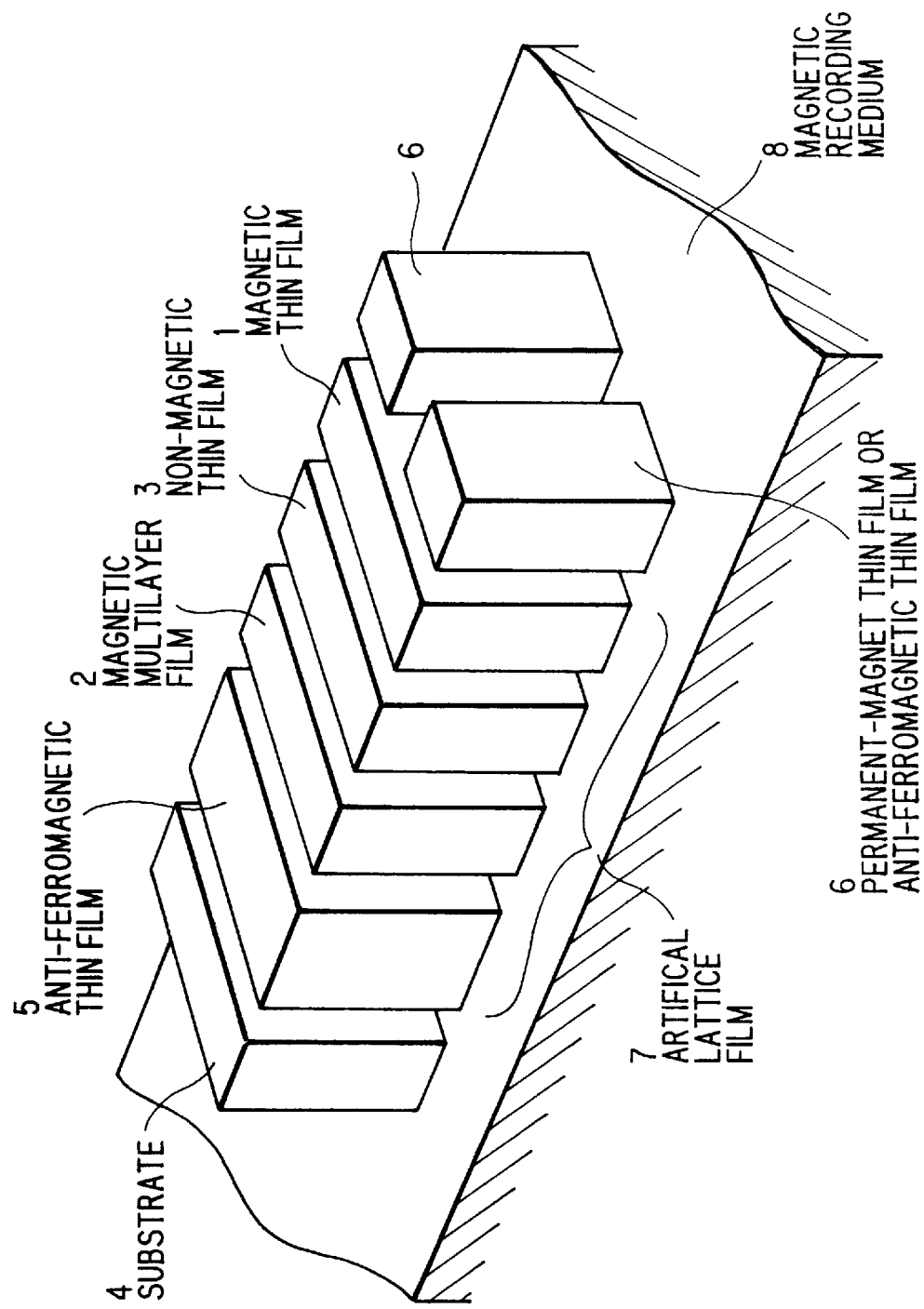
FIG. 2 is an illustration showing a magnetoresistive sensor using the magnetoresistance effect film in FIG. 1.

FIG. 2 is a developed perspective view showing a MR(magnetoresistance) sensor using the magnetoresistance effect film of the invention.

The MR sensor is, as shown in FIG. 2, composed of an artificial lattice film 7 which is formed on a substrate 4. In the artificial lattice 7, a magnetic thin film 1 is formed adjacent a non-magnetic thin film 3 next to magnetic multilayer thin film 2, which is anti-ferromagnetically coupled, formed on the substrate 4. Here, the weak magnetization directions of the magnetic thin film 1 and magnetic multilayer thin film 2 are set to be orthogonal to each other and a signal magnetic field output from a magnetic recording medium 8 is set to be perpendicular to the weak magnetization direction of the magnetic thin film 1. In this case, one-directional anisotropy may be given to the magnetic multilayer thin film 2 by anti-ferromagnetic thin film 5. Thus, the resistance is varied when the magnetization direction of the magnetic thin film 1 is rotated according to the intensity of the signal magnetic field from the magnetic recording medium 8. Thereby, the magnetic field is detected.

The relation between the external magnetic field and magnetization direction will be explained below. As shown in FIG. 3, the saturation magnetic field of the magnetic thin film 1 is $H_{S1}$ and the saturation magnetic field of the magnetic multilayer thin film 2 is $H_{S2}$. At the beginning, the external magnetic field H is applied to satisfy $H<-H_{S2}$ (region (A)). At this time, the magnetization directions of the magnetic thin film 1 and magnetic multilayer thin film 2 are directed in the −(negative) direction like H. As the external magnetic field H is weakened, the magnetization direction of the magnetic multilayer thin film 2 is, in case of $-H_{S2}<H<-H_{S1}$(region (B)), inverted in the + direction, and therefore the magnetization directions of the magnetic thin film 1 and magnetic multilayer thin film 2 are reversed to each other. In case of $-H_{S1}<H<H_{S1}$ (region (C)), the magnetization direction of the magnetic thin film 1 is rotated in the + direction, and therefore the magnetization directions of the magnetic thin film 1 and magnetic multilayer thin film 2 are identical with each other. In case of $H_{S1}<H$ (region (D)) or $H_{S2}<H$ (region (E)) where the external magnetic field is further increased, the magnetization direction of the magnetic multilayer thin film 2 is further rotated in the + direction, and therefore the magnetization directions of the magnetic thin film 1 and magnetic multilayer thin film 2 are directed aligning in the + direction.

Figure 4:
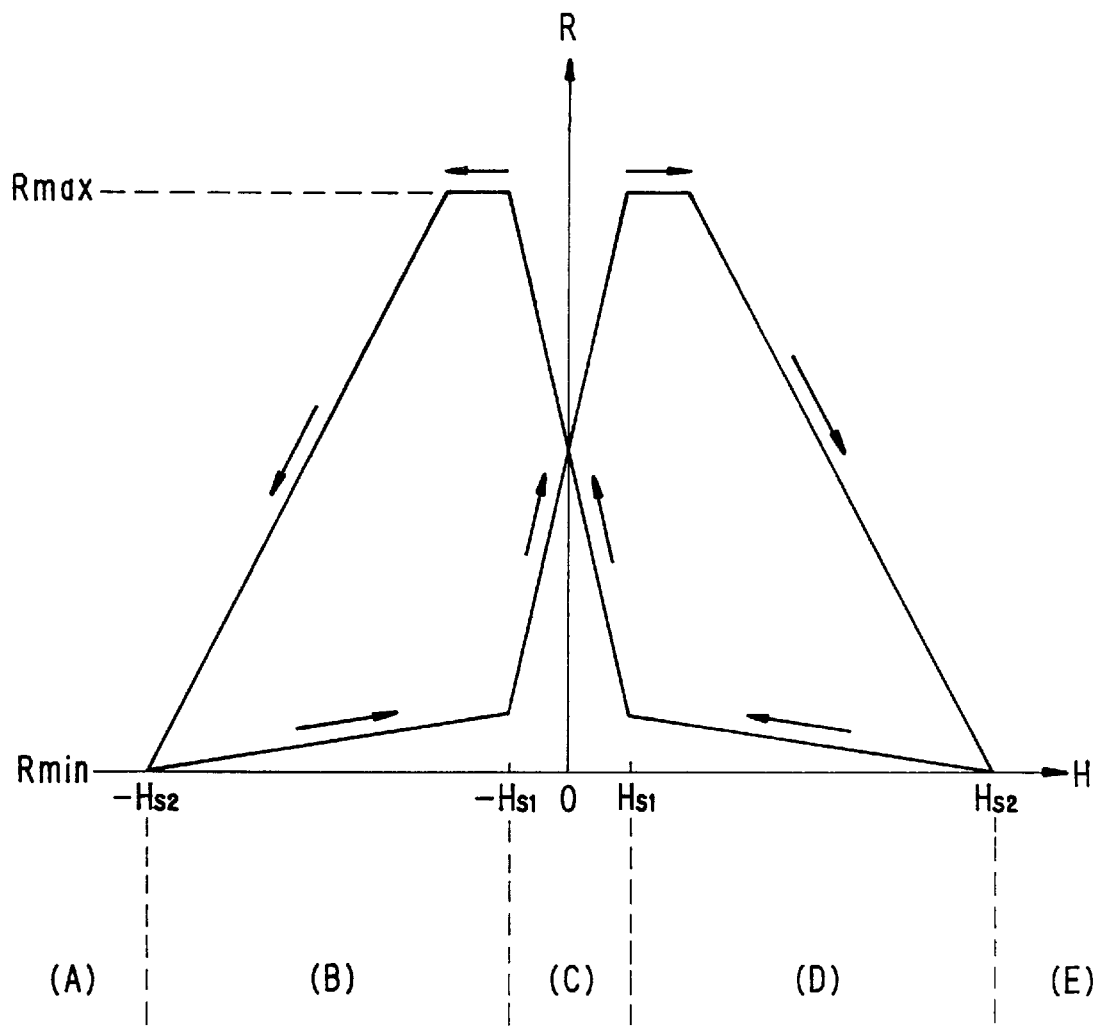
FIG. 4 is a graph showing R-H curve of the magnetoresistance effect film.

The resistance of the magnetoresistance effect film is, as shown in FIG. 4, varied according to the relative magnetization direction between the magnetic thin film 1 and magnetic multilayer thin film 2. It is linearly varied at around zero magnetic field, and a maximum value ($R_{MAX}$) is obtained in region (B) (or region (D) when the magnetic field is reversely applied).

Figure 1:
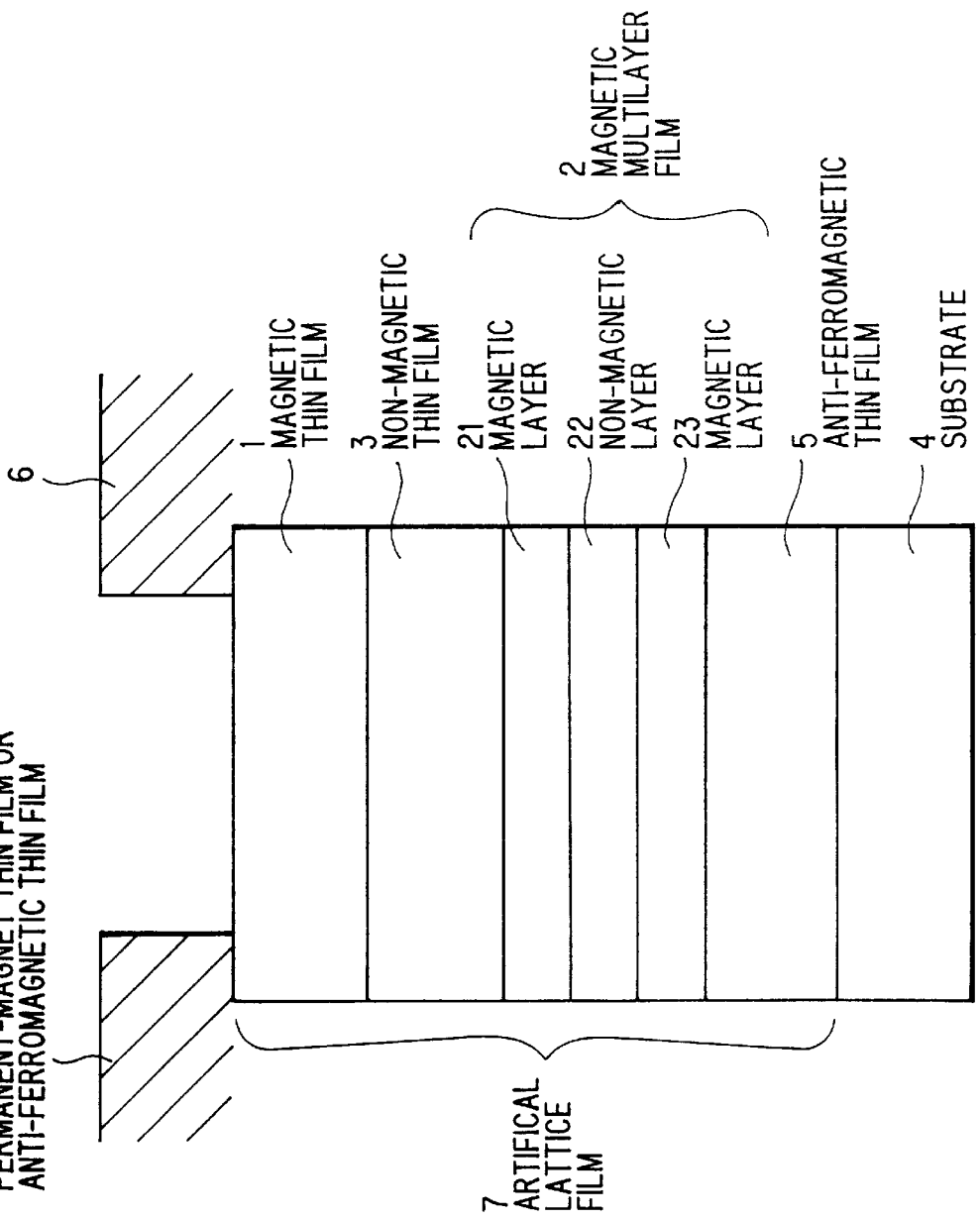
FIG. 1 is an illustration showing magnetoresistance effect film in a preferred embodiment according to the invention.

Next, an example of a magnetoresistance effect device composed of the magnetoresistance effect film in the embodiment will be explained in FIG. 1. FIG. 1 is a cross sectional view showing the artificial lattice film 7 composed of the magnetoresistance effect film in the embodiment.

The artificial lattice film 7 is composed of a magnetic thin film 1 and an anti-ferromagnetically coupled magnetic multilayer thin film 2 formed on a substrate 4, and a non-magnetic thin film 3 formed between the magnetic thin film 1 and magnetic multilayer thin film 2. An anti-ferromagnetic thin film 5 may be formed next to the magnetic multilayer thin film 2. The magnetic multilayer thin film 2 has a three-layer structure consisting of a magnetic layer 21, a non-magnetic layer 22 and a magnetic layer 23. Also, on the other side of the magnetic thin film 1, an anti-ferromagnetic thin film or permanent-magnet thin film 6 is formed. This artificial lattice film 7 functions as spin valve film.

Referring to specific experimental results, materials defined in the appended claims will be explained below.

The substrate, which is of glass, is put in a vacuum apparatus, then vacuumed up to a level of $10^{-7}$ Torr.

When the anti-ferromagnetic thin film is not used, the substrate temperature is kept to be at room temperature, then forming a base layer (Ru etc.) and anti-ferromagnetically coupled magnetic multilayer thin film [(NiFe, Co, FeCo, NiCo, NiFeCo)/(V, Cu, Mo, Ru, Rh, Re, Ir, Cr)/(NiFe, Co, FeCo, NiCo, NiFeCo)]x. When an oxide anti-ferromagnetic material is used as the anti-ferromagnetic thin film, the substrate temperature is kept to be at room temperature to 300° C., then forming 100 to 1000 Å thick NiO and 20 to 100 Å thick Fe—O thin film, then forming magnetic multilayer thin film [(NiFe, Co, FeCo, NiCo, NiFeCo)/(V, Cu, Mo, Ru, Rh, Re, Ir, Cr)/(NiFe, Co, FeCo, NiCo, NiFeCo)]x.

After forming the magnetic multilayer thin film as described above, the substrate temperature is set at room temperature, then forming non-magnetic thin film and magnetic thin film. In this case, the magnetic field applied during the forming of the films is rotated by 90° so that the weak magnetization axes of the magnetic multilayer thin film and magnetic thin film are orthogonal to each other. Also, when a Mn-system anti-ferromagnetic material is used as the anti-ferromagnetic thin film, the order of the magnetic multilayer thin film and magnetic thin film to be formed is reversed.

When anti-ferromagnetic thin film is used, the artificial lattice film is put in a furnace, then thermally treated at 200 to 300° C. while applying a 300 to 3 k Oe DC magnetic field in the weak magnetization direction of the exchange coupling layer (anti-ferromagnetically coupled magnetic multilayer thin film), thereby obtaining a magnetoresistance effect film.

The formation of film is conducted under conditions that NdFeB magnets are disposed on both sides of the glass substrate and an external magnetic field of around 300 Oe is applied parallel to the glass substrate. By measuring the B-H curve of this sample, it is shown that the magnetic field applying direction during the formation is the weak magnetization axis of the magnetic thin film.

The following samples of the artificial lattice film are formed at a rate of about 0.8 to 2.0 Å/sec. as to magnetic thin film and non-magnetic thin film (or magnetic layer and non-magnetic layer).

For example, Ru(20)/Co(20)/Ru(4)/Co(20)/Cu(30)/NiFe (60) means that magnetic multilayer thin film is obtained by forming 20 Å thick Ru thin film, 20 Å thick Co thin film, 4 Å thick Co thin film and 20 Å thick Co thin film on a substrate, and then non-magnetic thin film and magnetic thin film are obtained by forming 30 Å thick Cu thin film and 60 Å thick Ni 80%-Fe 20% thin film thereon.

The measurement of magnetization is conducted by using a vibration sample type magnetometer. The measurement of resistance is conducted by preparing a 1.0×10 mm² test sample from a sample, then measuring the resistance values by four-terminal method when an external magnetic field is varied from −1000 to 1000 Oe while applying in plane in the perpendicular direction to the current. Then, a magnetoresistance change factor ΔR/R is obtained from the resistance values. The magnetoresistance change factor ΔR/R is calculated by:

$$\Delta R/R = (R_{MAX} - R_{MIN})/R_{MIN} \times 100 [\%] \qquad (1)$$

where $R_{MAX}$ is a maximum resistance value and $R_{MIN}$ is a minimum resistance value.

Spin valve films obtained are as follows:
1. non-magnetic thin film Cu
   (a) glass/Ru(20)/Co(20)/Ru(4)/Cu(20 to 40)/NiFe(20 to 150)
2. insertion of Co-system magnetic material into interface between magnetic thin film and non-magnetic thin film
   (a) glass/Ru(20)/Co(20)/Ru(4)/Cu(20 to 40)/Co(3 to 40)/NiFe(20 to 150)
   (b) glass/Ru(20)/Co(20)/Ru(4)/Cu(20 to 40)/CoFe(3 to 40)/NiFe(20 to 150)
   (c) glass/Ru(20)/Co(20)/Ru(4)/Co(20)/Cu(20 to 40)/NiFeCo(3 to 40)/NiFe(20 to 50)
3. magnetic thin film $Co_{90}Fe_{10}$
   (a) glass/Ru(20)/Co(20)/Ru(4)/Co(20)/Cu(20 to 40)/$Co_{90}Fe_{10}$(20 to 150)
4. non-magnetic thin film Au
   (a) glass/Ru(20)/Co(20)/Ru(4)/Co(20)/Au(20 to 40)/NiFe(20 to 150)
5. non-magnetic thin film Ag
   (a) glass/Ru(20)/Co(20)/Ru(4)/Co(20)/Ag(20 to 40)/NiFe(20 to 150)
6. non-magnetic thin film Ru
   (a) glass/Ru(20)/Co(20)/Ru(4)/Co(20)/Ru(20 to 40)/NiFe(20 to 150)
7. non-magnetic thin film $Cu_{1-x}Ag_x$
   (a) glass/Ru(20)/Co(20)/Ru(4)/Co(20)/$Cu_{1-x}Ag_x$(20 to 40)/NiFe(20 to 150)
8. oxide samples of anti-ferromagnetic thin film (a) glass/NiO(150 to 500)/Fe—O(20)/Co(20)/Ru(4)/Co(20)/Cu(20 to 40)/NiFe(20 to 150)

(b) glass/NicoO(150 to 500)/Fe—O(20)/Co(20)/Ru(4)/Co(20)/Cu(20 to 40)/NiFe(20 to 150)

(c) glass/Fe—O(150 to 500)/Co(20)/Ru(4)/Co(20)/Cu(20 to 40)/NiFe(20 to 150)

(d) glass/NiO(150 to 500)/Co—O(10)/Co(20)/Ru(4)/Co(20)/Cu(20 to 40)/NiFe(20 to 150)

9. oxidation preventing film thickness dependent sample (a) glass/NiO(150 to 500)/Fe—O(20)/Fe(3 to 30)Co(20)/Ru(4)/Co(20)/Cu(20 to 40)/NiFe(20 to 150)

(b) glass/NiCoO(150 to 500)/Fe—O(20)/Fe(3 to 30)Co(20)/Ru(4)/Co(20)/Cu(20 to 40)/NiFe(20 to 150)

(c) glass/Fe—O(150 to 500)/Fe(3 to 30)Co(20)/Ru(4)/Co(20)/Cu(20 to 40)/NiFe(20 to 150)

(d) glass/NiO(150 to 500)/Co—O(10)/Fe(3 to 30)Co(20)/Ru(4)/Co(20)/Cu(20 to 40)/NiFe(20 to 150)

10. Mn-system samples of anti-ferromagnetic thin film (a) glass/Ta(50)/NiFe(20 to 150)/Cu(20 to 40)Co(20)/Ru(4)/Co(20)/FeMn(300)/Ta(50)

(b) glass/Ta(50)/NiFe(20 to 150)/Cu(20 to 40)Co(20)/Ru(4)/Co(20)/NiMn(300)/Ta(50)

(c) glass/Ta(50)/NiFe(20 to 150)/Cu(20 to 40)Co(20)/Ru(4)/Co(20) /PtMn(300)/Ta(50)

(d) glass/Ta(50)/NiFe(20 to 150)/Cu(20 to 40)Co(20)/Ru(4)/Co(20)PdMn(300)/Ta(50)

(e) glass/Ta(50)/NiFe(20 to 150)/Cu(20 to 40)Co(20)/Ru(4)/Co(20)/PdPtMn(300)/Ta(50)

(f) glass/Ta(50)/NiFe(20 to 150)/Cu(20 to 40)Co(20)/Ru(4)/Co(20)/CoMn(300)/Ta(50)

(g) glass/Ta(50)/NiFe(20 to 150)/Cu(20 to 40)Co(20)/Ru(4)/Co(20)/CrMn(300)/Ta(50)

(h) glass/Ta(50)/NiFe(20 to 150)/Cu(20 to 40)Co(20)/Ru(4)/Co(20)/CuMn(300)/Ta(50)

Figure 5:
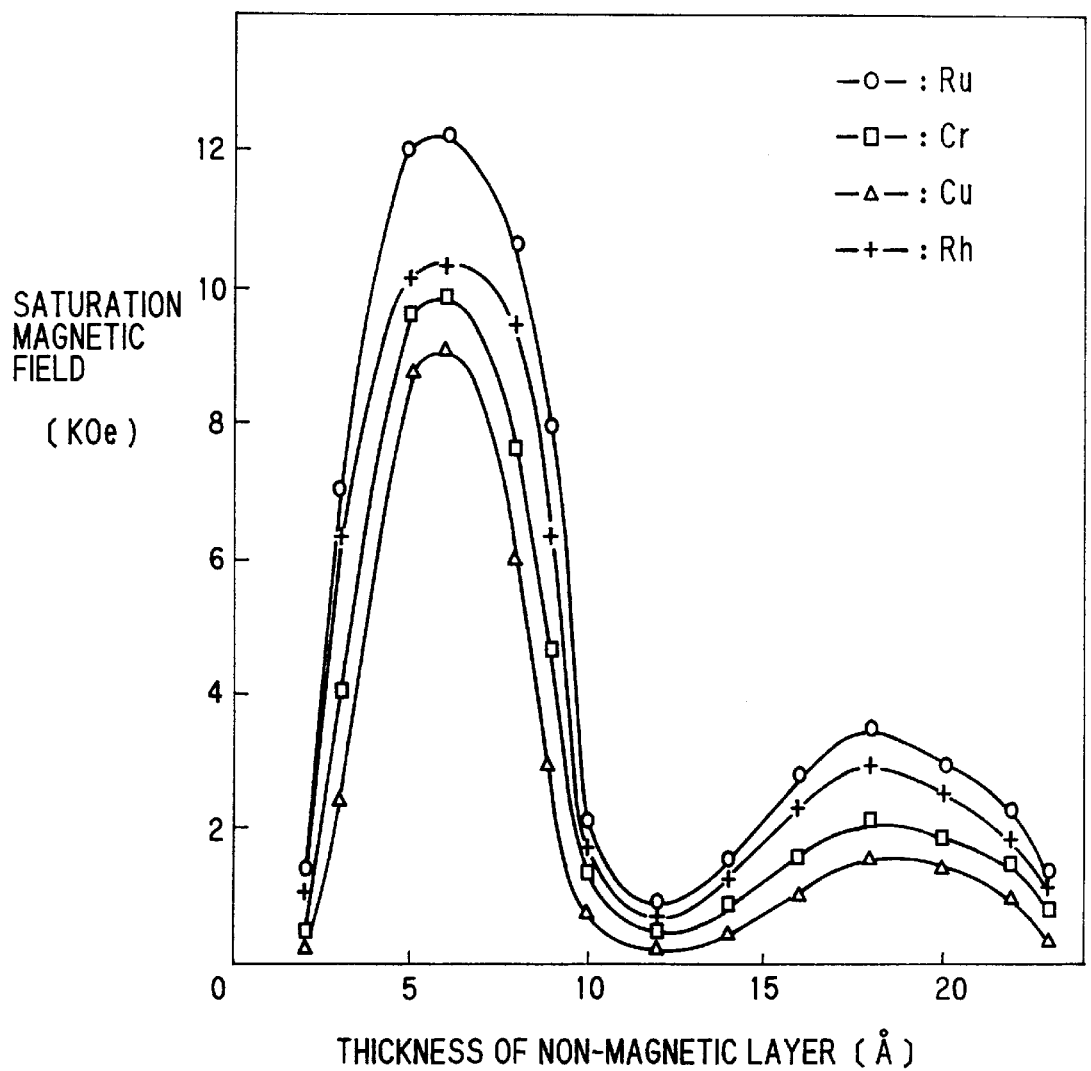
FIG. 5 is a graph showing non-magnetic layer thickness dependencies of saturation magnetic field in magnetic multilayer thin film in the magnetoresistance effect film.

FIG. 5 is a graph showing non-magnetic layer thickness dependencies of saturation magnetic field in magnetic multilayer thin film. The saturation magnetic field of magnetic multilayer thin film to be anti-ferromagnetically coupled has maximum values at 3 to 8 Å as to Ru, Cr, Cu, Rh non-magnetic layer. The intensities are about 8 to 12 kOe, which are significantly greater than that of saturation magnetic field of fixed layer in conventional spin valve film. Thus, this proves that the stability to the external magnetic field is excellent.

Figure 6:
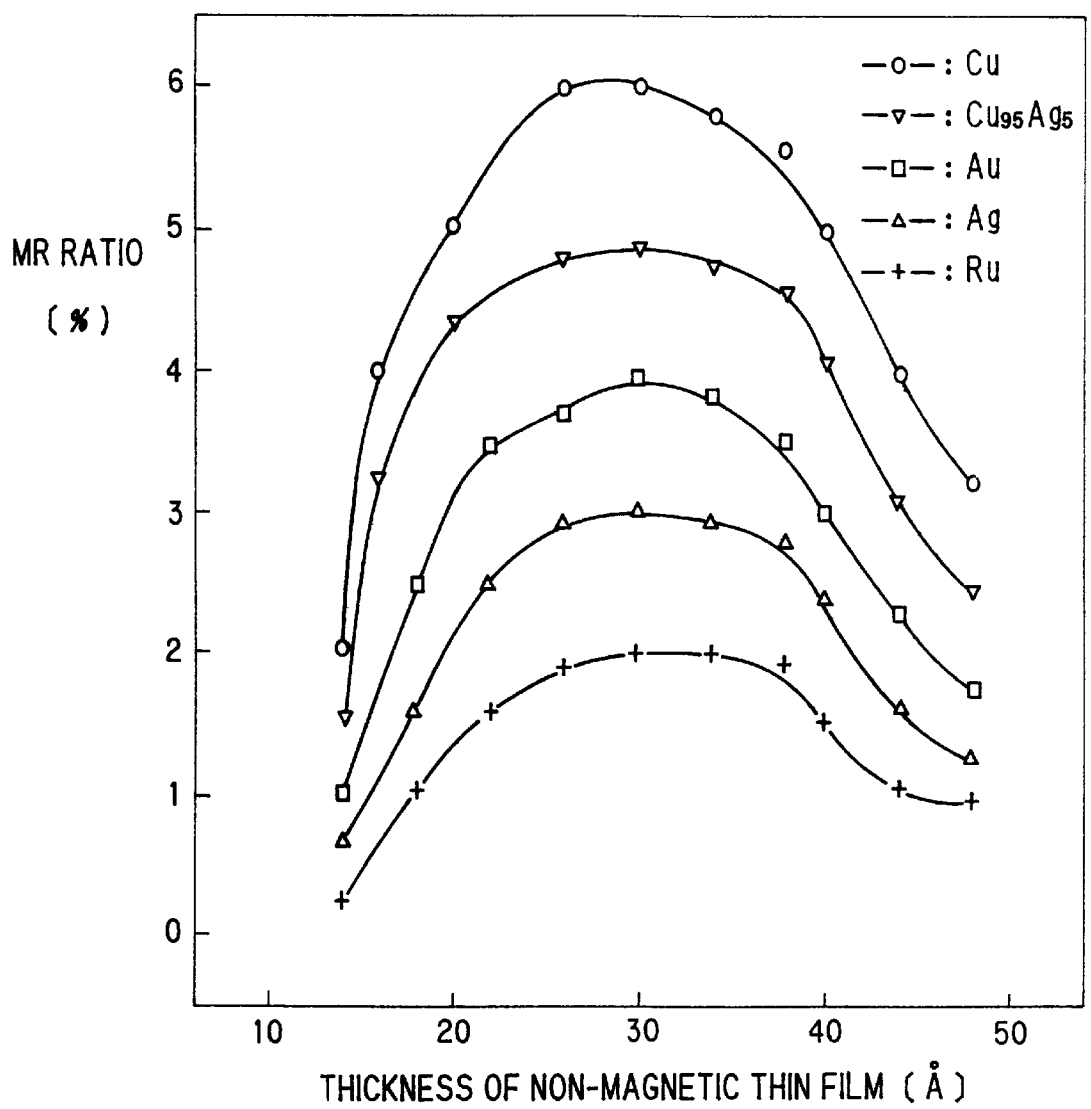
FIG. 6 is a graph showing non-magnetic layer thickness dependencies of resistance change ratio in the magnetoresistance effect film.

FIG. 6 is a graph showing non-magnetic thin film thickness dependencies of magnetoresistance change ratio. The magnetoresistance change ratio has maximum values at about 20 to 40 Å thickness of non-magnetic thin film. The maximum values obtained are about 2 to 6%.

Figure 7:
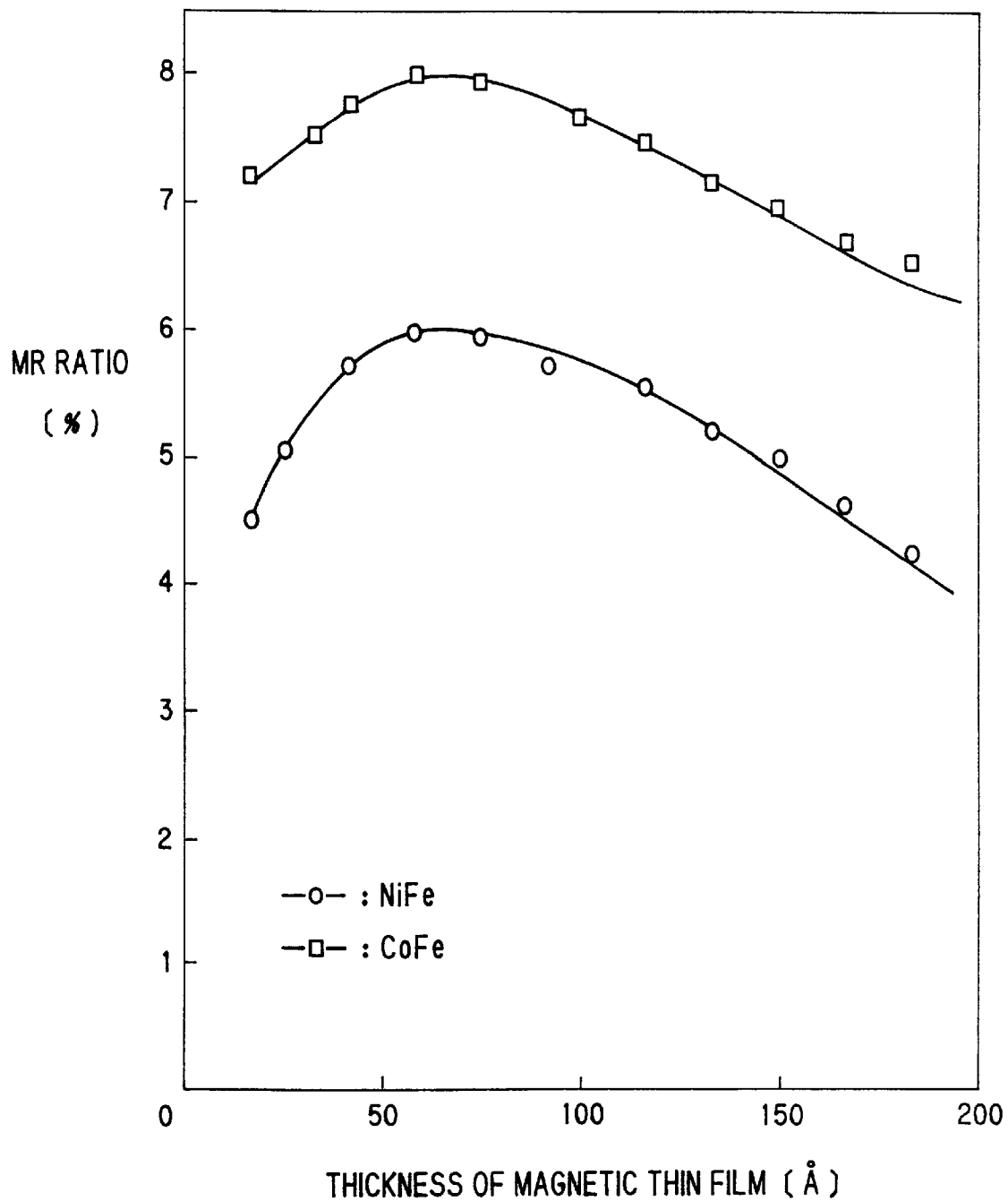
FIG. 7 is a graph showing magnetic layer thickness dependencies of resistance change ratio in the magnetoresistance effect film.

FIG. 7 is a graph showing magnetic thin film thickness dependencies of magnetoresistance change ratio. The magnetoresistance change ratio has maximum values at around 60 Å thickness of magnetic thin film. Namely, this proves that the effective film thickness attributing to spin-dependent scattering lies in this film thickness range.

Figure 8:
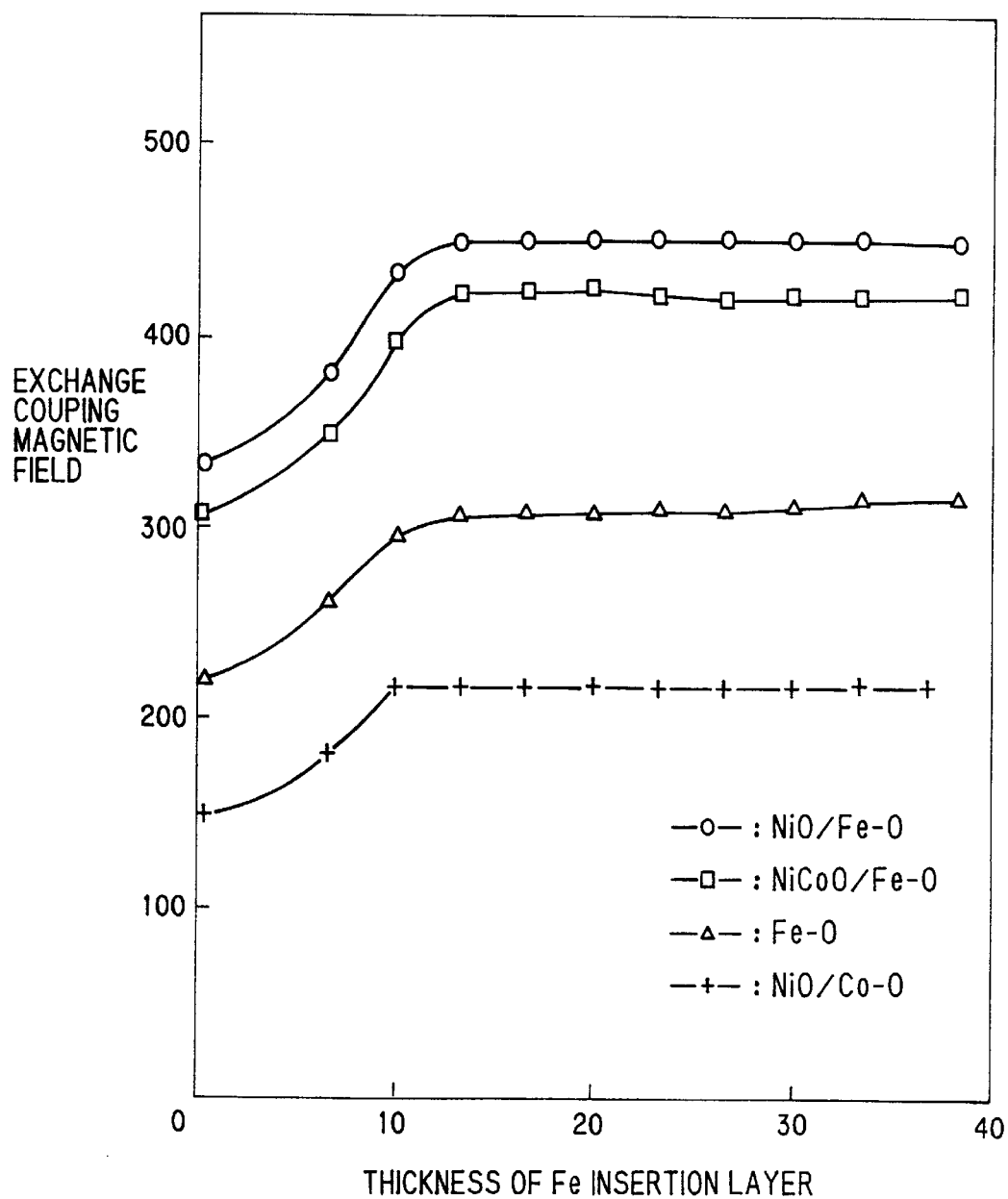
FIG. 8 is a graph showing Fe insertion layer thickness dependencies of exchange coupling magnetic field in the magnetoresistance effect film.

FIG. 8 is a graph showing Fe layer, which is inserted into the interface between anti-ferromagnetic thin film and magnetic layer (magnetic multilayer thin film), thickness dependencies of exchange coupling magnetic field when oxide anti-ferromagnetic thin film is used. These samples are thermally treated at 260° C. The reduction of exchange coupling magnetic field can be suppressed by the insertion of Fe, and the thermal stability of magnetoresistance change ratio can be also enhanced.

FIGS. 9 and 10 show exchange coupling magnetic fields when Mn-system anti-ferromagnetic thin film and oxide anti-ferromagnetic thin film are used. Exchange coupling magnetic field greater than 200 Oe is needed for practical magnetoresistance effect devices.

Figure 11:
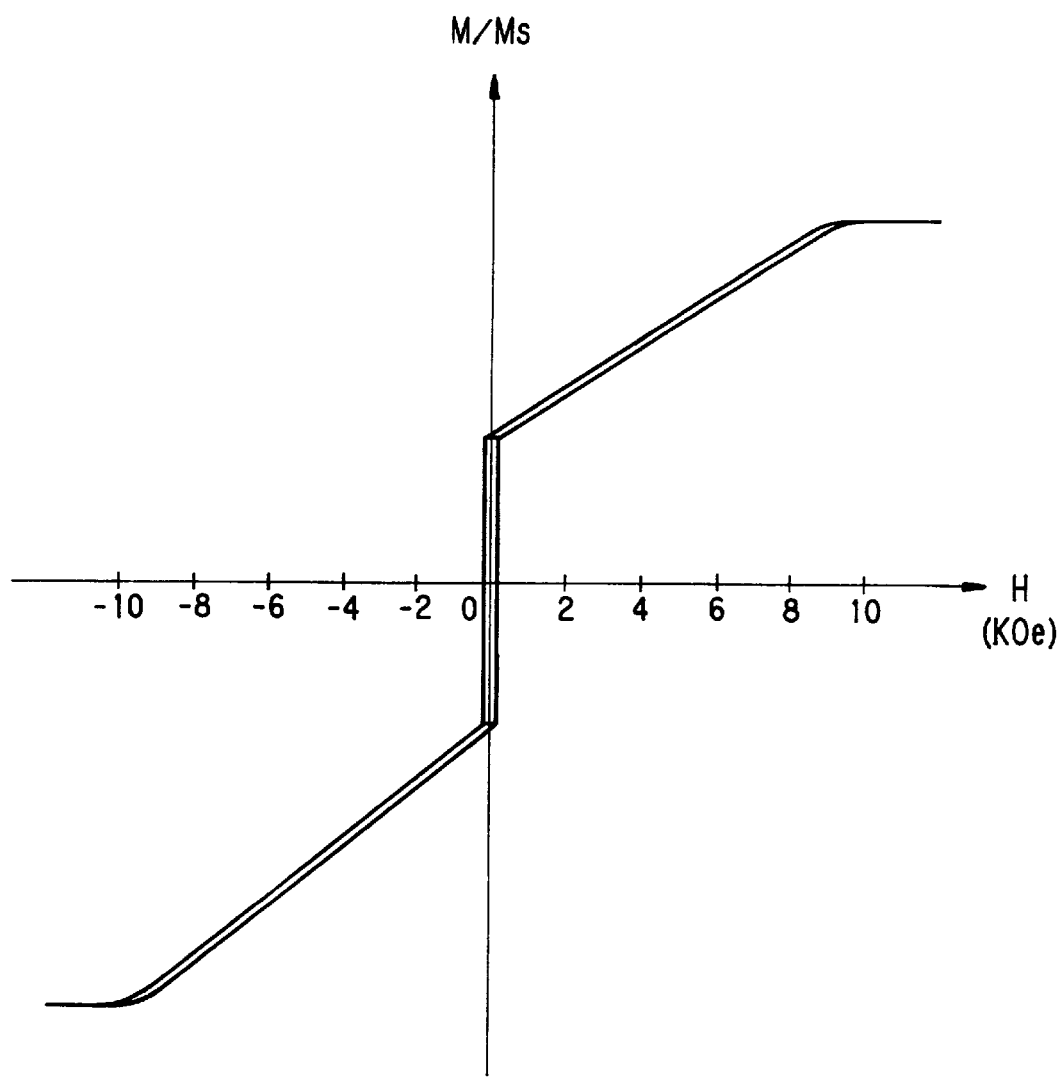
FIG. 11 is a graph showing B-H curve of the magnetoresistance effect film.
Figure 12:
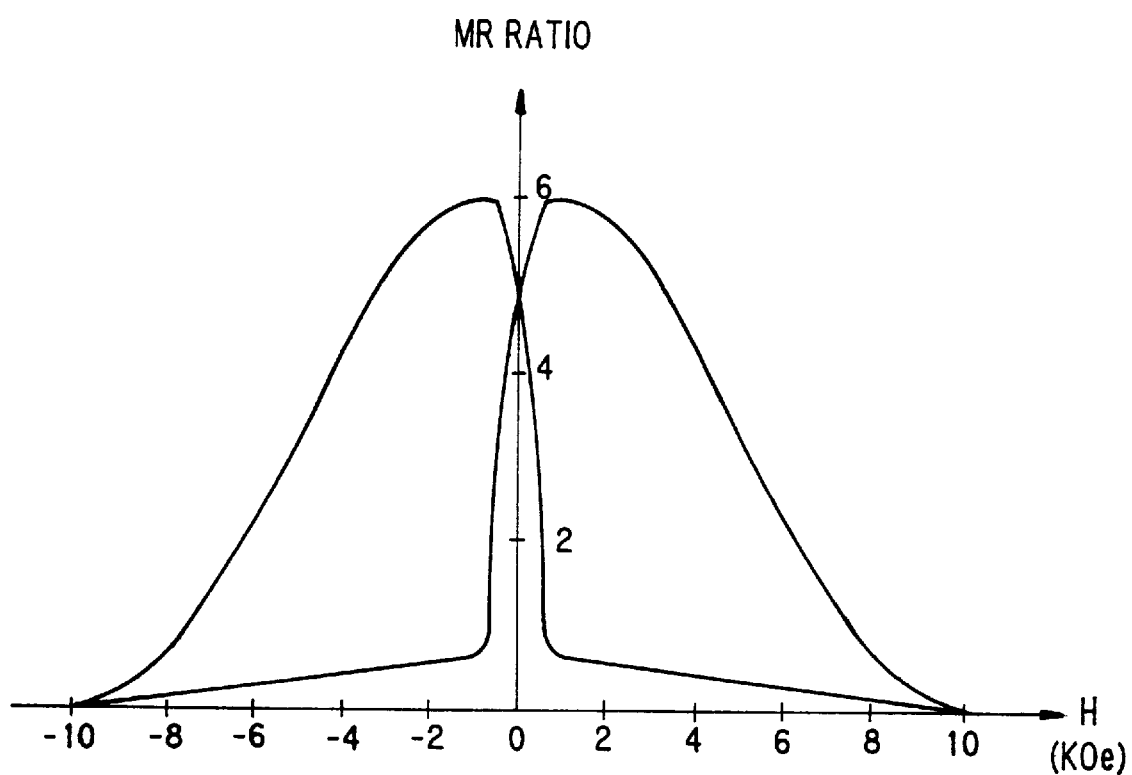
FIG. 12 is a graph showing MR curve of the magnetoresistance effect film.

FIGS. 11 and 12 show typical B-H curve and MR curve in magnetoresistance effect film of the invention.

FIG. 13 is a graph showing MR curve in a magnetoresistance effect device with a height of 1 µm and a width of 1.2 µm which is composed of spin valve film composed of magnetoresistance effect film of the invention and CoCrPt permanent-magnet thin film as magnetic domain stabilizing film disposed next to the spin valve film. By disposing the permanent-magnet thin film, the magnetic domain can be stabilized, and therefore a non-linear output, such as Barkhausen jump, can be avoided. Also, an output 6 to 10 times that in ordinary anisotropic magnetoresistance effect can be obtained.

Meanwhile, a magnetoresistance effect device, where a device height of 0.5 to 1.5 µm is given by finely processing magnetoresistance effect film of the invention and a detection current density of 0.5 to $5 \times 10^7$ A/cm² for detecting magnetic field is given, may be fabricated. Also, a magnetoresistance effect device may be fabricated by giving single magnetic domain to the magnetic thin film of magnetoresistance effect film of the invention by generating a sufficient bias. The bias generating means may be permanent-magnet film disposed next to the magnetic thin film, or another anti-ferromagnetic thin film disposed next to the magnetic thin film, Further, a shield-type magnetoresistive sensor may be fabricated by sandwiching the above magnetoresistance effect device through upper and lower insulating layers between high-permeability weak magnetic materials. Also, a yoke-type magnetoresistive sensor with a structure that a signal magnetic field is led through a high-permeability weak magnetic material from the above magnetoresistance effect device may be fabricated. Further, a magnetoresistance detecting system may be composed of the above magnetoresistance effect device and means for detecting the resistance change ratio of the magnetoresistance effect device as a function of magnetic field to be detected.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. Magnetoresistance effect film, comprising:
    a magnetic thin film; and
    a magnetic multilayer thin film which is layered through a 20 to 40 Å thick non-magnetic thin film next to said magnetic thin film, wherein said magnetic multilayer thin film being anti-ferromagnetically coupled, wherein said magnetic thin film and said magnetic multilayer thin film have saturation magnetic fields $H_{S1}$ and $H_{S2}$, respectively, which satisfy the relation of $H_{S1} < H_{S2}$.

2. Magnetoresistance effect film, according to claim 1, further comprising:
    anti-ferromagnetic thin film which is formed on said magnetic multilayer thin film or on which said magnetic multilayer thin film is formed.

3. Magnetoresistance effect film, according to claim 1, wherein:
    said magnetic multilayer thin film is composed of at least three layers in which a magnetic layer and a non-magnetic layer are alternately layered.

4. Magnetoresistance effect film, according to claim 2, wherein:

said magnetic multilayer thin film is composed of at least three layers in which a magnetic layer and a non-magnetic layer are alternately layered.

5. Magnetoresistance effect film, according to claim 3, wherein:

said magnetic layer comprises one or more materials selected from the group consisting of Ni, Fe, Co, FeCo, NiFe and NiFeCo.

6. Magnetoresistance effect film, according to claim 3, wherein:

said non-magnetic layer comprises one or more materials selected from the group consisting of V, Cu, Mo, Ru, Rh, Re, Ir and Cr.

7. Magnetoresistance effect film, according to claim 1, wherein:

said anti-ferromagnetic thin film comprises one or more materials selected from the group consisting of FeMn, IrMn, CrMn, CoMn, CuMn, PtMn, PdMn, RhMn and NiMn.

8. Magnetoresistance effect film, according to claim 1, wherein:

said anti-ferromagnetic thin film comprises one or more materials selected from the group consisting of a cobalt oxide, a nickel oxide, a nickel-cobalt oxide and an α-phase iron oxide.

9. Magnetoresistance effect film, according to claim 1, wherein:

said anti-ferromagnetic thin film has a surface roughness of 2.0 to 15 Å.

10. Magnetoresistance effect film, according to claim 1, wherein:

said non-magnetic thin film comprises one or more materials selected from the group consisting of Au, Ag, Cu and Ru.

11. Magnetoresistance effect film, according to claim 2, wherein:

said non-magnetic thin film comprises one or more materials selected from the group consisting of Au, Ag, Cu and Ru.

12. Magnetoresistance effect film, according to claim 1, wherein:

said magnetic thin film has a thickness of 10 to 150 Å.

13. Magnetoresistance effect film, according to claim 2, wherein:

said magnetic thin film has a thickness of 10 to 150 Å.

14. Magnetoresistance effect film, according to claim 1, wherein:

said magnetic thin film comprises one or more materials selected from the group consisting of Ni, Fe, Co, FeCo, NiFe and NiFeCo.

15. Magnetoresistance effect film, according to claim 2, wherein:

said magnetic thin film comprises one or more materials selected from the group consisting of Ni, Fe, Co, FeCo, NiFe and NiFeCo.

16. Magnetoresistance effect film, according to claim 4, wherein:

said magnetic thin film comprises one or more materials selected from the group consisting of Ni, Fe, Co, FeCo, NiFe and NiFeCo.

17. Magnetoresistance effect film, according to claim 1, further comprising:

a layer which is inserted into the interface between said non-magnetic thin film and said magnetic thin film, wherein said layer has a thickness of 3 to 40 Å and comprises a material selected from the group consisting of Co, FeCo, NiCo and NiFeCo.

18. Magnetoresistance effect film, according to claim 2, further comprising:

a layer which is inserted into the interface between said non-magnetic thin film and said magnetic thin film, wherein said layer has a thickness of 3 to 40 Å and comprises a material selected from the group consisting of Co, FeCo, NiCo and NiFeCo.

19. Magnetoresistance effect film, according to claim 3, further comprising:

a layer which is inserted into the interface between said non-magnetic thin film and said magnetic thin film, wherein said layer has a thickness of 3 to 40 Å and comprises a material selected from the group consisting of Co, FeCo, NiCo and NiFeCo.

20. Magnetoresistance effect film, according to claim 1, further comprising:

a layer which is inserted into the interface between said non-magnetic thin film and said magnetic multilayer thin film, wherein said layer has a thickness of 3 to 40 Å and comprises a material selected from the group consisting of Co, FeCo, NiCo and NiFeCo.

21. Magnetoresistance effect film, according to claim 1, further comprising:

a layer which is inserted into the interface between said non-magnetic thin film and said magnetic multilayer thin film, wherein said layer has a thickness of 3 to 40 Å and comprises a material selected from the group consisting of Co, FeCo, NiCo and NiFeCo.

22. Magnetoresistance effect film, according to claim 3, further comprising:

a layer which is inserted into the interface between said non-magnetic thin film and said magnetic multilayer thin film, wherein said layer has a thickness of 3 to 40 Å and comprises a material selected from the group consisting of Co, FeCo, NiCo and NiFeCo.

23. Magnetoresistance effect film, according to claim 8, further comprising:

a Fe layer with a thickness of 3 to 30 Å which is inserted into the interface between said anti-ferromagnetic thin film and said magnetic multilayer thin film.

* * * * *